United States Patent
Shen et al.

(10) Patent No.: US 10,564,673 B2
(45) Date of Patent: Feb. 18, 2020

(54) SUPPORTING ASSEMBLY

(71) Applicant: Acer Incorporated, New Taipei (TW)

(72) Inventors: Chao-Di Shen, New Taipei (TW); Yan-Lin Kuo, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 16/278,185

(22) Filed: Feb. 18, 2019

(65) Prior Publication Data

US 2019/0179369 A1 Jun. 13, 2019

Related U.S. Application Data

(63) Continuation of application No. 15/644,840, filed on Jul. 10, 2017.

(30) Foreign Application Priority Data

Sep. 1, 2016 (TW) .............................. 105128196 A

(51) Int. Cl.
*G06F 1/16* (2006.01)
*F16M 11/38* (2006.01)
(Continued)

(52) U.S. Cl.
CPC ....... *G06F 1/1633* (2013.01); *F16M 11/2021* (2013.01); *F16M 11/38* (2013.01);
(Continued)

(58) Field of Classification Search
CPC .. F16M 11/2021; F16M 11/38; F16M 13/022; F16M 2200/021; F16M 2200/024; G06F 1/1633; G06F 1/166; G06F 1/16
See application file for complete search history.

(56) References Cited

U.S. PATENT DOCUMENTS 5,682,644 A * 11/1997 Bohacik .................. E05F 1/061
16/284
7,140,074 B2 * 11/2006 Han ...................... H04M 1/022
16/366
(Continued)

FOREIGN PATENT DOCUMENTS

| CN | 101299776 | 11/2008 |
| CN | 101611558 | 12/2009 |
| CN | 105485491 | 4/2016 |

*Primary Examiner* — Nkeisha Smith
(74) *Attorney, Agent, or Firm* — JCIPRNET

(57) ABSTRACT

A supporting assembly including a stand and a positioning module is provided. The positioning module includes a carrier, a first rod, a first guiding element, a second guiding element, at least one position-limiting element, and at least one elastic element. The carrier is fixed to a portable electronic device. The first rod is pivoted to the carrier and the stand is fixed to the first rod. The first guiding element is fixed to the first rod. The second guiding element is movably disposed on the first rod, and the first guiding element and the second guiding element are coupled to each other. The position-limiting element is disposed at a side of the second guiding element, and the second guiding element is located between the position-limiting element and the first guiding element. The elastic element leans against the position-limiting element and the second guiding element.

13 Claims, 5 Drawing Sheets

(51) Int. Cl.
*F16M 13/00* (2006.01)
*F16M 13/02* (2006.01)
*F16M 11/20* (2006.01)

(52) U.S. Cl.
CPC .......... *F16M 13/00* (2013.01); *F16M 13/022* (2013.01); *G06F 1/166* (2013.01); *F16M 2200/021* (2013.01); *F16M 2200/024* (2013.01); *G06F 1/16* (2013.01)

(56) References Cited

U.S. PATENT DOCUMENTS

| | | | | |
|---|---|---|---|---|
| 7,738,930 | B2* | 6/2010 | Petrella | H04M 1/022 16/221 |
| 7,932,894 | B2* | 4/2011 | Oakley | G06F 1/1618 345/169 |
| 7,936,559 | B2* | 5/2011 | Chen | G06F 1/1662 16/303 |
| 8,231,099 | B2* | 7/2012 | Chen | F16M 11/10 248/461 |
| 8,493,725 | B2* | 7/2013 | Wu | G06F 1/1624 248/611 |
| 8,526,171 | B2* | 9/2013 | Wu | F16M 13/005 16/342 |
| 8,625,268 | B2* | 1/2014 | Duan | H04M 1/0235 248/611 |
| 8,646,152 | B2 | 2/2014 | Lin et al. | |
| 8,938,855 | B2* | 1/2015 | Ahn | F16C 11/04 16/354 |
| 9,395,761 | B2* | 7/2016 | Yukawa | G06F 1/1675 |
| 9,557,776 | B1* | 1/2017 | Oakeson | G06F 1/1679 |
| 9,683,693 | B2* | 6/2017 | Yu | F16M 13/005 |
| 9,748,999 | B2* | 8/2017 | Nyholm | H04B 1/3888 |
| 9,822,567 | B1* | 11/2017 | Lin | E05D 11/082 |
| 9,857,022 | B2* | 1/2018 | Liu | F16M 11/38 |
| 2005/0155182 | A1* | 7/2005 | Han | H04M 1/022 16/336 |
| 2007/0094842 | A1* | 5/2007 | Chang | G06F 1/1616 16/330 |
| 2009/0231797 | A1* | 9/2009 | Kim | G06F 1/1626 361/679.27 |
| 2010/0071159 | A1* | 3/2010 | Myung | H04M 1/022 16/303 |
| 2011/0047751 | A1* | 3/2011 | Chen | G06F 1/1681 16/303 |
| 2011/0099756 | A1* | 5/2011 | Chen | G06F 1/1618 16/297 |
| 2014/0117199 | A1* | 5/2014 | Liu | A47B 23/042 248/688 |
| 2014/0293534 | A1* | 10/2014 | Siddiqui | E05D 7/00 361/679.55 |
| 2014/0347814 | A1* | 11/2014 | Zaloom | G06F 1/1626 361/679.56 |
| 2014/0376180 | A1* | 12/2014 | Chen | G06F 1/1681 361/679.55 |
| 2015/0121654 | A1* | 5/2015 | Novin | E05D 3/02 16/273 |
| 2015/0345203 | A1* | 12/2015 | Vanini | E05D 3/02 16/53 |
| 2016/0034004 | A1* | 2/2016 | Park | G06F 1/1681 16/330 |
| 2017/0218674 | A1* | 8/2017 | Shen | F16M 11/10 |
| 2017/0328109 | A1* | 11/2017 | Lambright | E05F 1/123 |
| 2017/0371379 | A1* | 12/2017 | Liang | F16C 11/04 |

* cited by examiner

SUPPORTING ASSEMBLY

CROSS-REFERENCE TO RELATED APPLICATION

This application is a continuation application of and claims the priority benefit of U.S. application Ser. No. 15/644,840, filed on Jul. 10, 2017, now allowed, which claims the priority benefit of Taiwan application serial no. 105128196, filed on Sep. 1, 2016. The entirety of each of the above-mentioned patent application is hereby incorporated by reference herein and made a part of this specification.

BACKGROUND OF THE INVENTION

Field of the Invention

The invention relates to a supporting assembly, and more specifically to a supporting assembly integrated with a portable electronic device.

Description of Related Art

Portable electronic devices such as notebook computer, smartphone, or tablet computer are easy to carry, have many advantages such as instantly sending, receiving, and processing information, etc., and therefore are widely favored by the consumer. Take the tablet computer as an example, the tablet computer has a larger display screen than the smartphone and has a lighter weight than the notebook computer, so it has become one of the best options for the consumer when purchasing electronic products. In order to provide comfort in operating the tablet computer, the manufacturers release the external supporting assembly as an option for the consumer to purchase. When the consumer positions the tablet computer to stand on a working plane and does not want to operate the the tablet computer in a hand-held manner, the external supporting assembly is assembled to the back cover of the tablet computer, and one edge of the back cover and the supporting assembly form at least two supporting points, so the tablet computer can stand on the working plane. However, the external supporting assembly has several disadvantages, for example, the external supporting assembly is inconvenient to carry and easy to be forgot, etc.

SUMMARY OF THE INVENTION

The invention provides a supporting assembly to improve the convenience in operation.

The invention proposes a supporting assembly adapted to a portable electronic device. The supporting assembly includes a stand and a positioning module. The positioning module includes a carrier, a first rod, a first guiding element, a second guiding element, at least one position-limiting element, and at least one elastic element. The carrier is fixed to a portable electronic device. The first rod is pivoted to the carrier and the stand is fixed to the first rod. The first guiding element is fixed to the first rod. The second guiding element is movably disposed on the first rod, and the first guiding element and the second guiding element are coupled to each other. The position-limiting element is disposed at a side of the second guiding element, and the second guiding element is located between the position-limiting element and the first guiding element. The elastic element leans against the position-limiting element and the second guiding element, wherein when the stand is rotated with respect to the carrier through the first rod, the first guiding element rotates together with the first rod and drives the second guiding element to move along a direction and compress the elastic element.

Based on the above, the supporting assembly of the invention is integrated into the portable electronic device, wherein the stand is able to be rotated with respect to the portable electronic device through the positioning module so as to transform from a folded state to expanded state. Accordingly, the portable electronic device and the stand in the expanded state form at least two supporting points, so the portable electronic device can stand on the working plane. Therefore, the supporting assembly of the invention improves the convenience in operation.

In order to make the aforementioned and other features and advantages of the invention more comprehensible, embodiments accompanying figures are described in detail belows.

DESCRIPTION OF THE EMBODIMENTS

Figure 1:
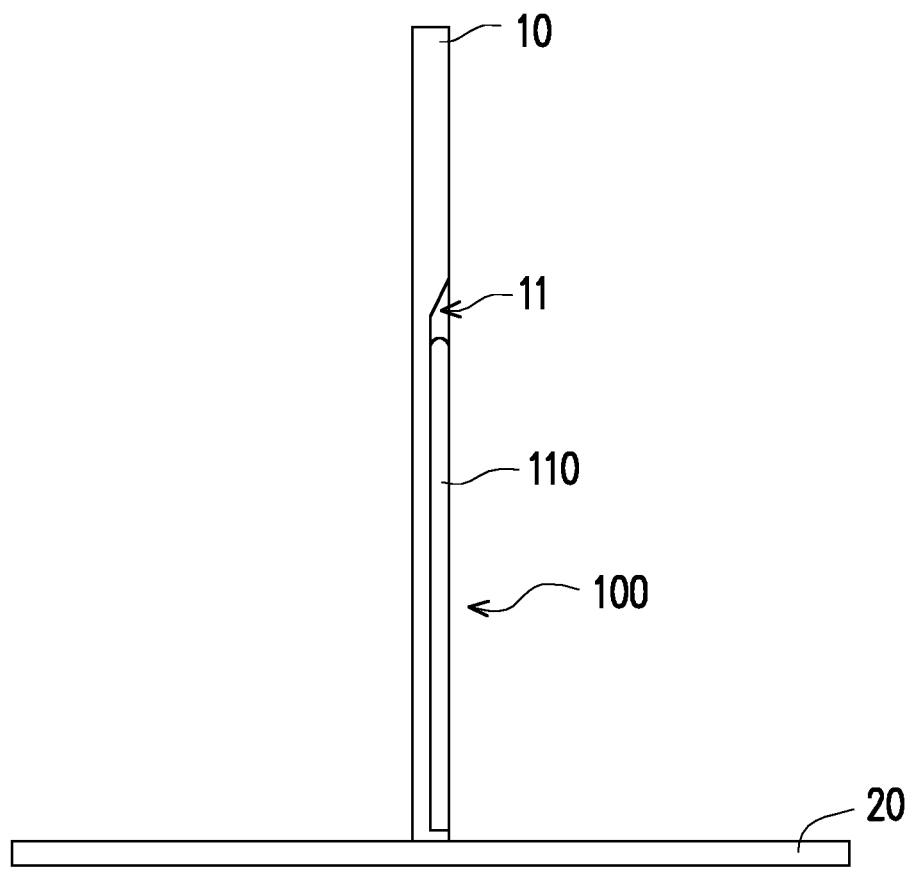
FIG. 1 is a schematic side view of a portable electronic device according to one embodiment of the invention.
Figure 2A:
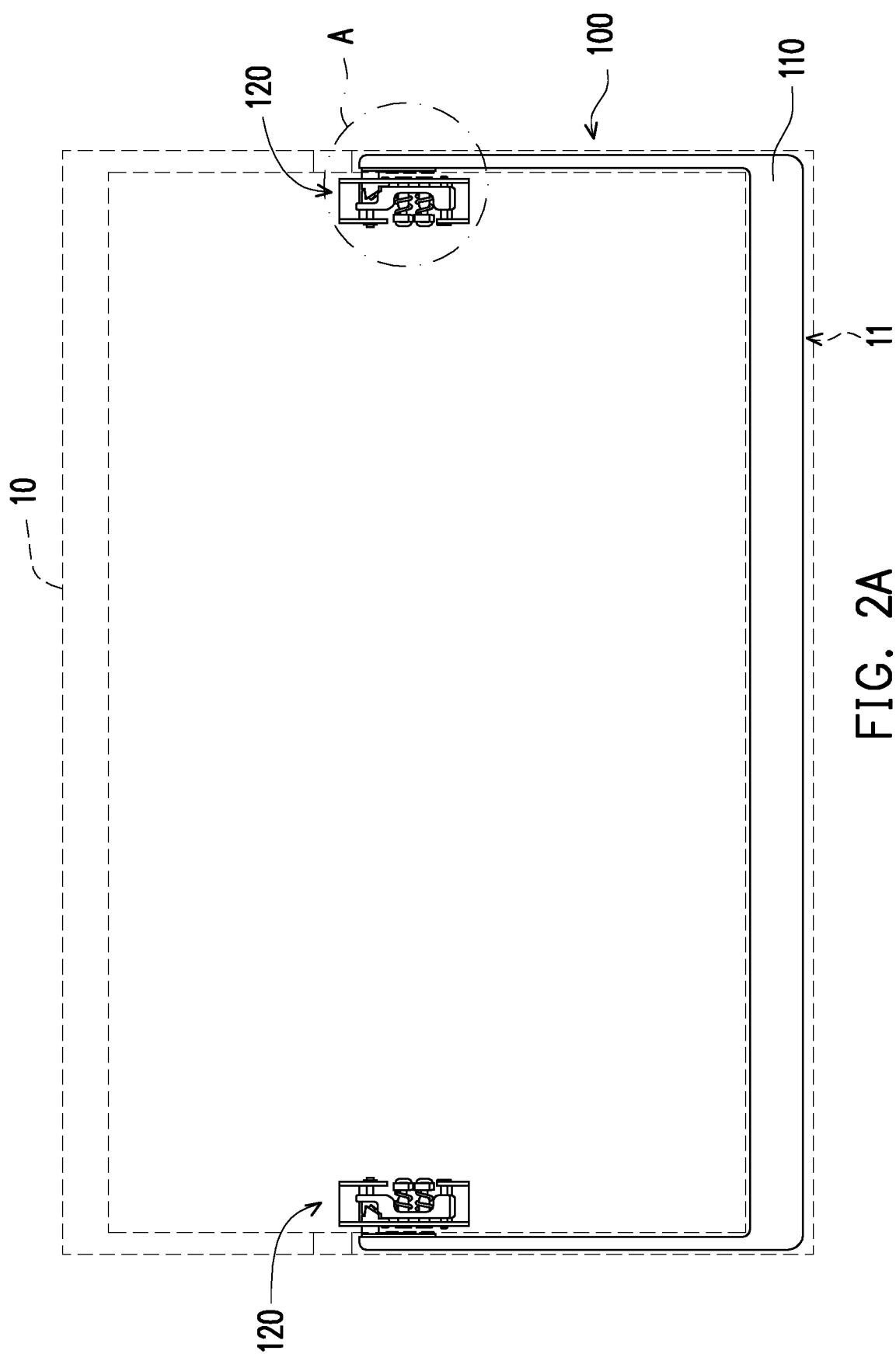
FIG. 2A is a schematic front view of the portable electronic device in FIG. 1.
Figure 2B:
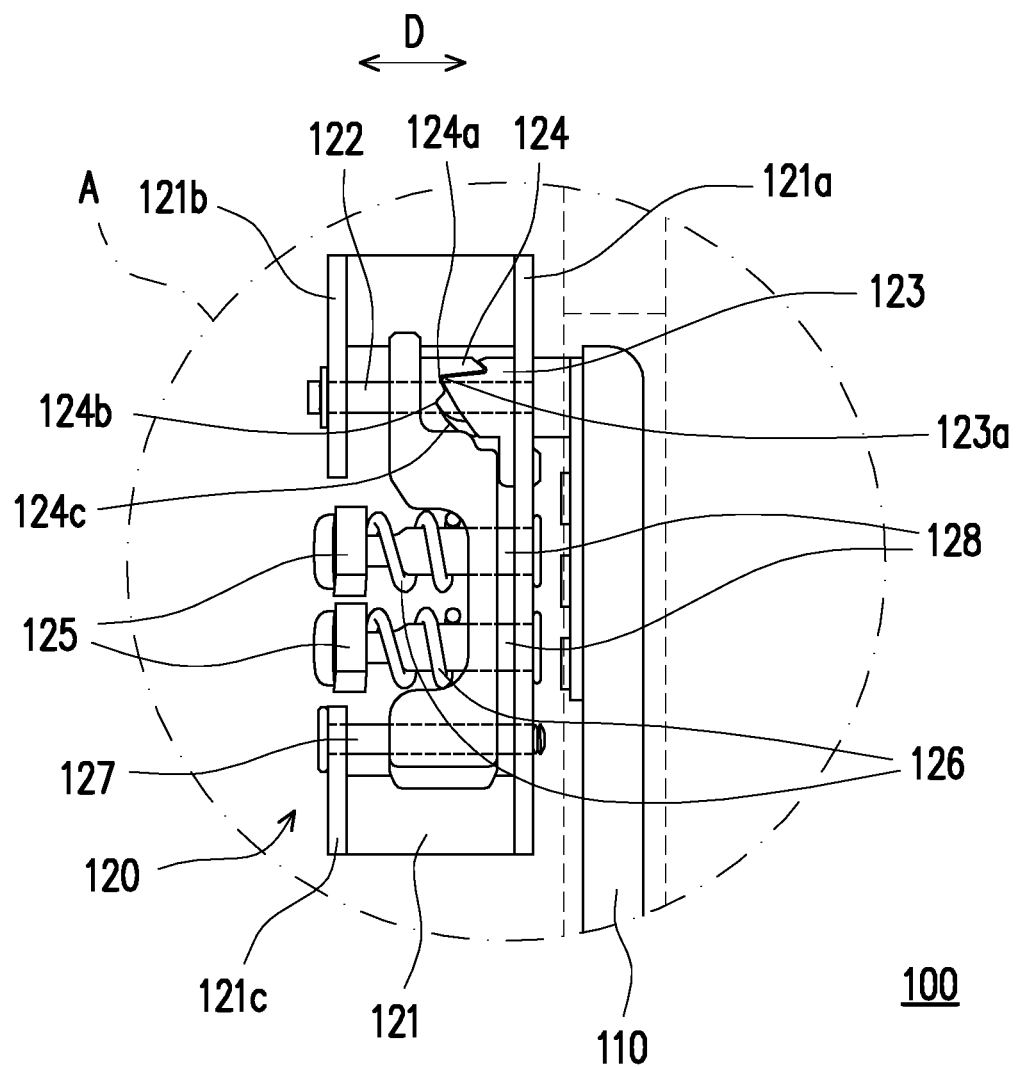
FIG. 2B is a partially enlarged view of a supporting assembly depicted in an area A of FIG. 2A.

FIG. 1 is a schematic side view of a portable electronic device according to one embodiment of the invention. FIG. 2A is a schematic front view of the portable electronic device in FIG. 1. FIG. 2B is a partially enlarged view of a supporting assembly depicted in an area A of FIG. 2A. For clarity and ease of explanation, the portable electronic device is depicted by dotted line in FIG. 2A and FIG. 2B. Referring to FIGS. 1-2B, in the present embodiment, a supporting assembly 100 is assembled with a portable electronic device 10, wherein the portable electronic device 10 may be a tablet computer, a smartphone, a display device, all-in-one (AIO) computer, or other devices, and the portable electronic device 10 can stand on a working plane 20 via the supporting assembly 100. Generally, the supporting assembly 100 is disposed on a back cover of the portable electronic device 10, namely, a display screen is disposed at one side of the portable electronic device 10 and the supporting assembly 100 is disposed at another side. The supporting assembly 100 includes a stand 110 and a positioning module 120, wherein the portable electronic device 10 has a groove 11 accommodating the stand 110. When the stand 110 is in a folded state, the stand 110 can be folded into the groove 11, so as to maintain the appearance integrity of the portable electronic device 10.

The stand 110 is connected to the positioning module 120, wherein the number of the positioning modules 120 is two, the two positioning modules 120 are symmetrically disposed at the portable electronic device 10. As shown in FIG. 2A, the stand 110 is a U-shaped stand and connected to two positioning modules 120. Each of the positioning module 120 includes a carrier 121, a first rod 122, a first guiding element 123, a second guiding element 124, at least one position-limiting element 125, and at least one elastic element 126, and the number of each of the position-limiting elements 125 and the elastic elements 126 is schematically depicted as two in the drawings. The carrier 121 is fixed to the portable electronic device 10, the first rod 122 penetrates through the carrier 121 and is able to rotate with respect to the carrier 121. In other words, the first rod 122 is pivoted to the carrier 121. On the other hand, the stand 110 is fixed to the first rod 122, the first guiding element 123 is fixed on the first rod 122, and the second guiding element 124 is movably disposed on the first rod 122. The second guiding element 124 and the stand 110 are respectively located at two opposite sides of the first guiding element 123, wherein the first guiding element 123 and the second guiding element 124 are coupled to each other, and the second guiding element 124 is able to move back and forth on the first rod 122 along a direction D.

More specifically, the carrier 121 has a first position-limiting portion 121a, a second position-limiting portion 121b, and a third position-limiting portion 121c, and the second position-limiting portion 121b and the third position-limiting portion 121c are located at the same side of the first position-limiting portion 121a. The first rod 122 penetrates through the first position-limiting portion 121a, the first guiding element 123, the second guiding element 124, and the second position-limiting portion 121b, wherein the first position-limiting portion 121a is located between the stand 110 and the first guiding element 123, the first guiding element 123 and the second guiding element 124 are located between the first position-limiting portion 121a and the second position-limiting portion 121b, and the first guiding element 123 is located between the second guiding element 124 and the first position-limiting portion 121a. In other words, the second guiding element 124 is configured to move back and forth between the first guiding element 123 and the second position-limiting portion 121b.

In the present embodiment, the positioning module 120 further includes a second rod 127 penetrating through the first position-limiting portion 121a, the second guiding element 124, and the third position-limiting portion 121c. The first rod 122 and the second rod 127 are arranged in parallel and separately penetrate through the second guiding element 124, thereby increasing the stability of the second guiding element 124 when moving back and forth along the direction D and preventing the second guiding element 124 from rotating with respect to the carrier 121. The first guiding element 123 has a positioning portion 123a, wherein the second guiding element 124 has an engaging portion 124a, a locking portion 124b, and an inclined portion 124c connected to each other, and the locking portion 124b is located between the engaging portion 124a and the inclined portion 124c. When the stand 110 is received into the groove 11, the positioning portion 123a is engaged with the engaging portion 124a, so as to prevent the stand 110 from being unintendedly rotated with respect to the carrier 121 (or the portable electronic device 10).

The position-limiting element 125 is disposed at a side of the second guiding element 124, and the second guiding element 124 is located between the position-limiting element 125 and the first guiding element 123. As shown in FIG. 2B, the position-limiting element 125, the second position-limiting portion 121a, and the third position-limiting portion 121b are located at the same side and actually arranged to form a straight line. The elastic element 126 is a compression spring that leans against the position-limiting element 125 and the second guiding element 124. In the present embodiment, the positioning module 120 further includes at least one third rod 128, wherein the number of the third rods 128 is corresponding to the number of the position-limiting elements 125 and the number of the elastic elements 126, and the third rod 128 penetrates through the first position-limiting portion 121a and the second guiding element 124. The position-limiting element 125 is connected to one end of the third rod 128 that penetrates through the second guiding element 124, wherein the elastic element 126 is sleeved on the third rod 128 and is positionally limited between the second guiding element 124 and the position-limiting element 125.

Figure 3:
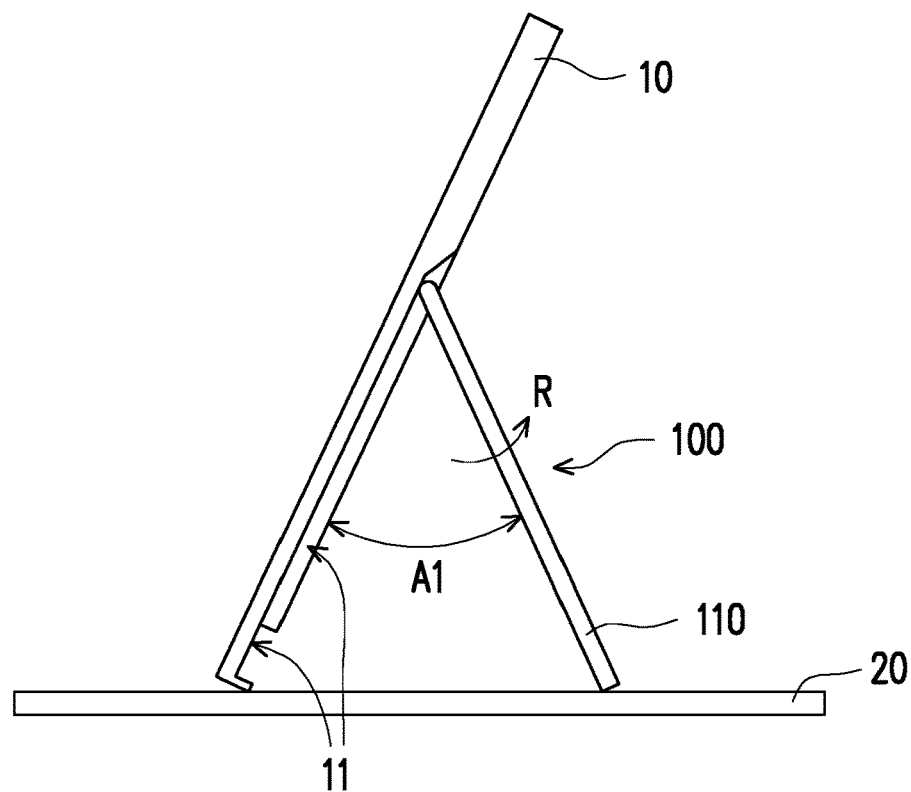
FIG. 3 is a schematic side view of a stand in FIG. 1 expanding to a first angle to make the portable electronic device stand on a working plane.
Figure 4:
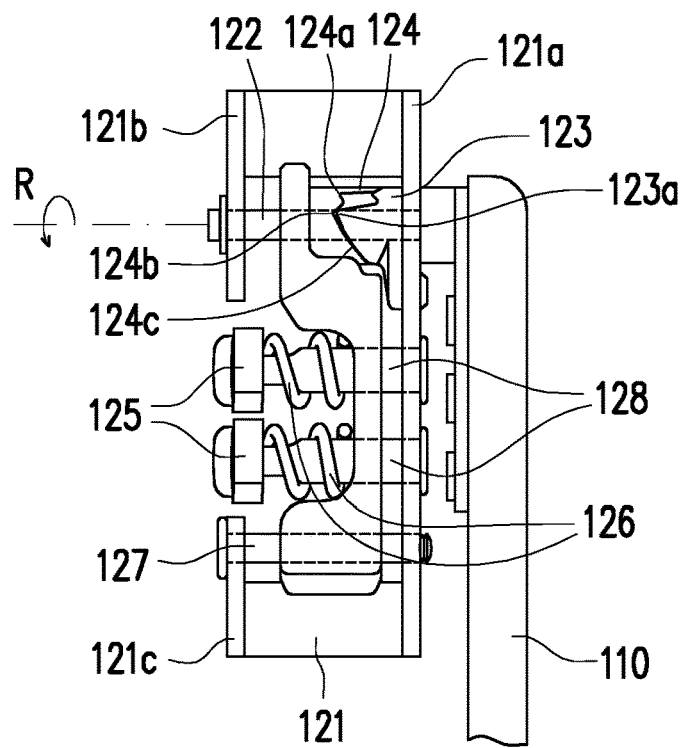
FIG. 4 is partially enlarged view of the supporting assembly in a state shown in FIG. 3.

FIG. 3 is a schematic side view of a stand in FIG. 1 expanding to a first angle to make the portable electronic device stand on a working plane. FIG. 4 is partially enlarged view of the supporting assembly in a state shown in FIG. 3. Referring to FIGS. 3-4, when a force is applied to the stand 110 to make the stand 110 rotate with respect to the carrier 121 (or the portable electronic device 10) along a rotating direction R, the first guiding element 123 rotates together with the first rod 122 and drives the second guiding element 124 to move closer to the position-limiting element 125 and along the direction D (as depicted in FIG. 2B), so as to compress the elastic element 126. At this time, the positioning portion 123a departs from the engaging portion 124a and moves to the locking portion 124b, so the stand 110 expands to a first angle A1 with respect to the portable electronic device 10. Accordingly, the portable electronic device 10 and the stand 110 in the expanded state form at least two supporting points, so the portable electronic device 10 can stand on the working plane 20 at an angle that the user can view. In detail, a force applied to the stand 110 by the weight of the portable electronic device 10 can make the positioning portion 123a lean against the locking portion 124b, so as to keep the elastic element 126 in a compressed state.

Figure 5:
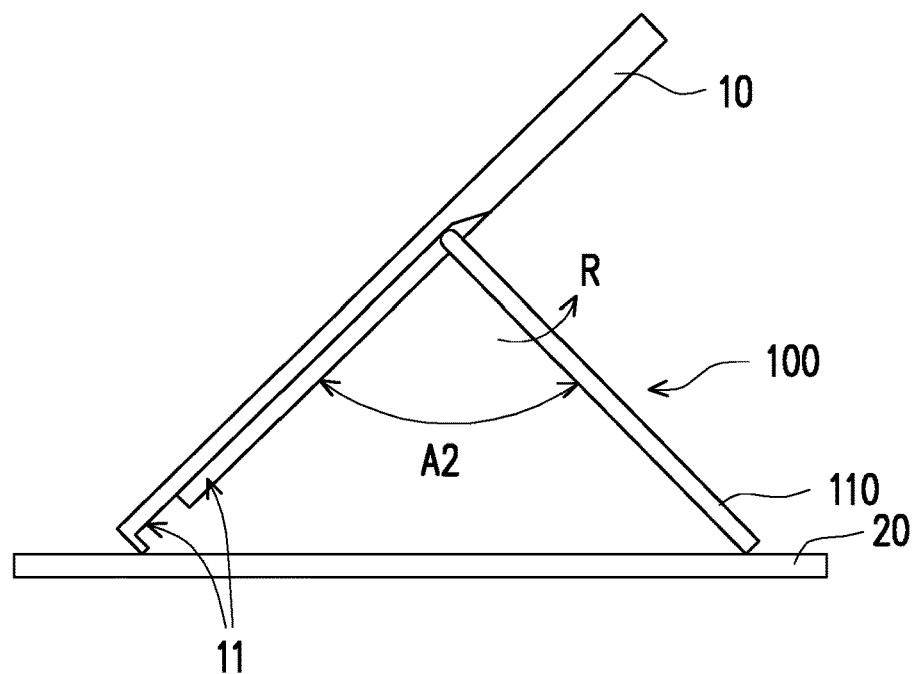
FIG. 5 is a schematic side view of the stand in FIG. 3 expanding from the first angle to a second angle to make the portable electronic device stand on the working plane.
Figure 6:
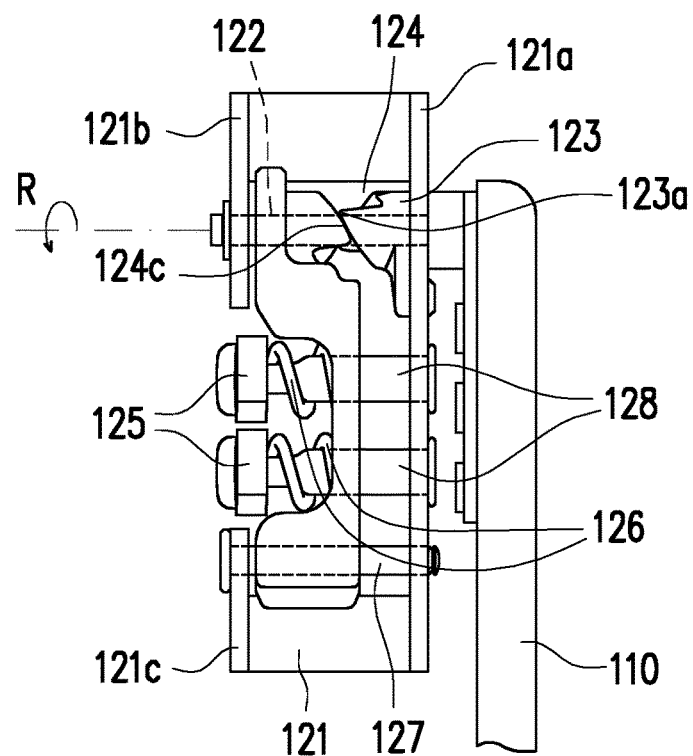
FIG. 6 is partially enlarged view of the supporting assembly in a state shown in FIG. 5.

FIG. 5 is a schematic side view of the stand in FIG. 3 expanding from the first angle to a second angle to make the portable electronic device stand on the working plane. FIG. 6 is partially enlarged view of the supporting assembly in a state shown in FIG. 5. Referring to FIGS. 5-6, the user can apply a force to the portable electronic device 10, so as to make the stand 110 continue to rotate with respect to the carrier 121 (or the portable electronic device 10) along the rotating direction R. At this time, the first guiding element 123 rotates together with the first rod 122 and drives the second guiding element 124 to move along the direction D (as depicted in FIG. 2B) and towards the position-limiting element 125, so as to further compress the elastic element 126. Therefore, the positioning portion 123a moves from the locking portion 124b to the inclined portion 124c, so the stand 110 expands to a second angle A2 with respect to the portable electronic device 10, wherein the second angle A2 is greater than the first angle A1. Accordingly, the portable electronic device 10 and the stand 110 in the expanded state still form at least two supporting points, so the portable electronic device 10 can stand on the working plane 20 at another angle that the user can view. In detail, a force applied to the stand 110 by the weight of the portable electronic device 10 can make the positioning portion 123a lean against the inclined portion 124c, so as to keep the elastic element 126 in the compressed state.

In the process of the stand 110 being rotated with respect to the carrier 121 (or the portable electronic device 10) along the rotating direction R, the positioning portion 123a sequentially moves along the engaging portion 124a, the locking portion 124b, and the inclined portion 124c. On the contrary, when the user moves the portable electronic device 10 away from the working plane 20, the elastic potential energy stored when the elastic element 126 is compressed is released to drive the second guiding element 124 to move away from the position-limiting element 125 and along the direction D (as depicted in FIG. 2B). At this time, the first guiding element 123 is driven by the second guiding element 124 to rotate in a reverse direction of the rotating direction R, and the positioning portion 123a can sequentially moves from the inclined portion 124c through the locking portion 124b to the engaging portion 124a, so as to drive the stand 110 to rotate with respect to the carrier 121 (or the portable electronic device 10). Therefore, the stand 110 returns into the groove 11, so the elastic element 126 returns to the state shown in FIG. 2B.

In summary, the supporting assembly of the invention is integrated into the portable electronic device, wherein the stand is able to be rotated with respect to the portable electronic device through the positioning module so as to transform from a folded state to an expanded state, so an angle between the portable electronic device and the stand has different values. Accordingly, the portable electronic device and the stand in the expanded state form at least two supporting points, so the portable electronic device can stand on the working plane at different angles that the user can view. Therefore, the supporting assembly of the invention improves the convenience in operation.

Although the invention has been disclosed with reference to the aforesaid embodiments, they are not intended to limit the invention. It will be apparent to one of ordinary skill in the art that modifications and variations to the described embodiments may be made without departing from the spirit and the scope of the invention. Accordingly, the scope of the invention will be defined by the attached claims and not by the above detailed descriptions.

What is claimed is:

1. A supporting assembly, adapted to a portable electronic device, the supporting assembly comprising:
    a stand; and
    a positioning module, comprising:
        a carrier, fixed to the portable electronic device;
        a first rod, pivoted to the carrier and extending along a first axis, and the stand being fixed to the first rod;
        a first guiding element, fixed to the first rod;
        a second guiding element, movably disposed on the first rod, and the first guiding element and the second guiding element being coupled to each other;
        at least one position-limiting element, disposed at a side of the second guiding element, and the second guiding element being located between the position-limiting element and the first guiding element; and
        at least one elastic element, leaning against the position-limiting element and the second guiding element, and the elastic element extending along a second axis different from the first axis, wherein when the stand is rotated with respect to the carrier through the first rod, the first guiding element rotates together with the first rod and drives the second guiding element to move along a direction and compress the elastic element.

2. The supporting assembly as recited in claim 1, wherein the carrier has a first position-limiting portion, a second position-limiting portion, and a third position-limiting portion, and wherein the second position-limiting portion and the third position-limiting portion are located at a same side of the first position-limiting portion, the first rod penetrates through the first position-limiting portion and the second position-limiting portion, the first guiding element and the second guiding element are located between the first position-limiting portion and the second position-limiting portion, and the first guiding element is located between the second guiding element and the first position-limiting portion.

3. The supporting assembly as recited in claim 2, wherein the positioning module further comprises a second rod penetrating through the first position-limiting portion and the third position-limiting portion, and the first rod and the second rod are arranged in parallel.

4. The supporting assembly as recited in claim 3, wherein the first rod and the second rod separately penetrate through the second guiding element.

5. The supporting assembly as recited in claim 3, wherein the elastic element is disposed between the first rod and the second rod.

6. The supporting assembly as recited in claim 3, wherein the position-limiting element is disposed between the first rod and the second rod.

7. The supporting assembly as recited in claim 1, wherein the first guiding element has a positioning portion, and the second guiding element has an engaging portion, a locking portion, and an inclined portion connected to each other, and wherein the locking portion is located between the engaging portion and the inclined portion, when the stand is rotated with respect to the carrier through the first rod, the first guiding element rotates together with the first rod, and the positioning portion sequentially moves along the engaging portion, the locking portion, and the inclined portion.

8. The supporting assembly as recited in claim 1, wherein the positioning module further comprises a second rod which is in parallel with the first rod and at least one third rod penetrating through the carrier and the second guiding element, and the position-limiting element is connected to one end of the third rod.

9. The supporting assembly as recited in claim 8, wherein the elastic element is sleeved on the third rod.

10. The supporting assembly as recited in claim 8, wherein the first rod and the third rod are arranged in parallel.

11. The supporting assembly as recited in claim 1, wherein the elastic element is a compression spring.

12. The supporting assembly as recited in claim 1, wherein a number of the positioning modules is two, the two positioning modules are symmetrically disposed at the portable electronic device, and the stand is connected to the two positioning modules.

13. The supporting assembly as recited in claim 1, wherein the stand is a U-shaped stand.

* * * * *